UNITED STATES PATENT OFFICE.

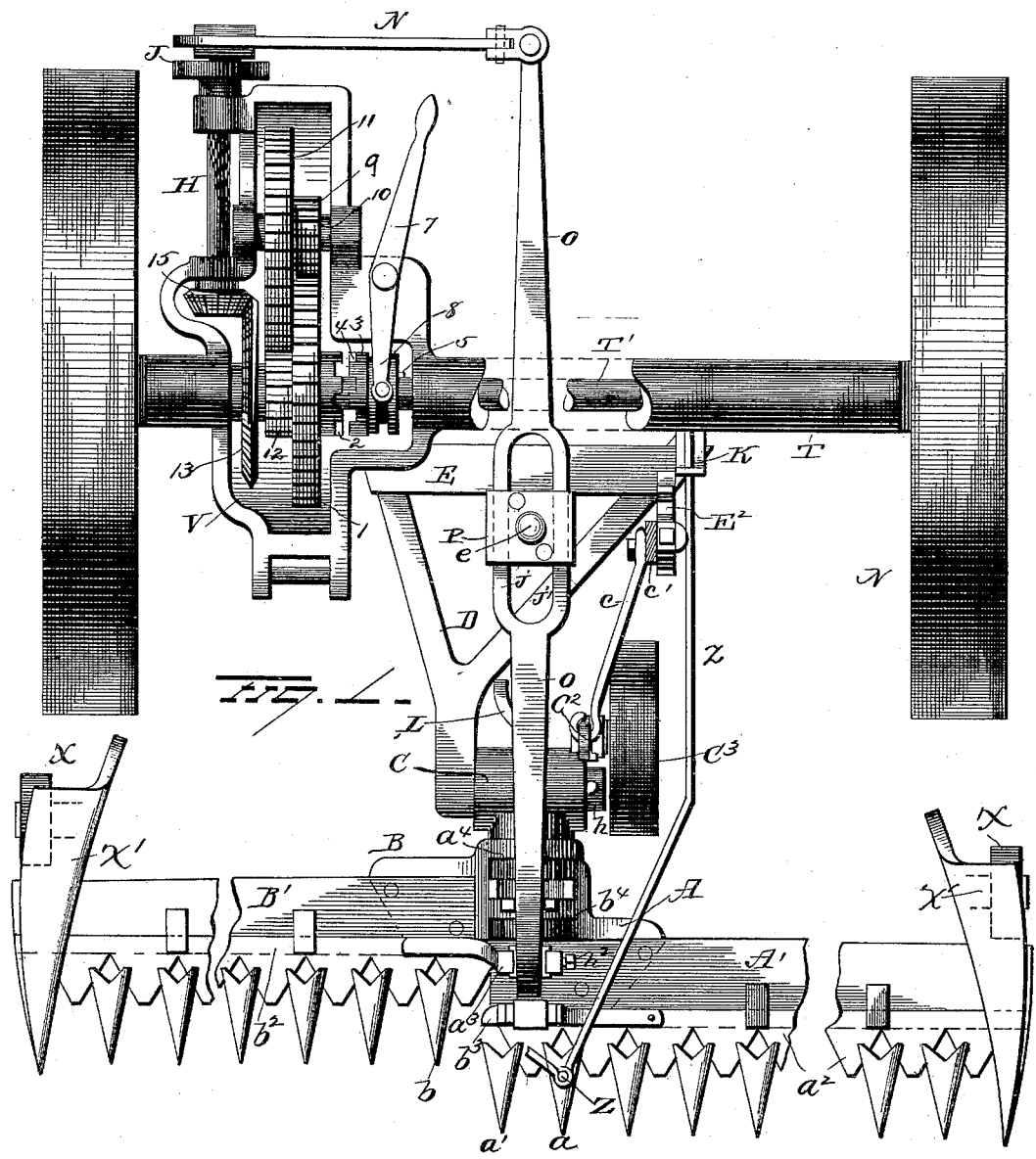
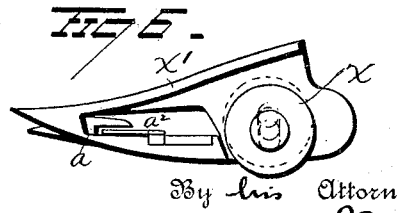

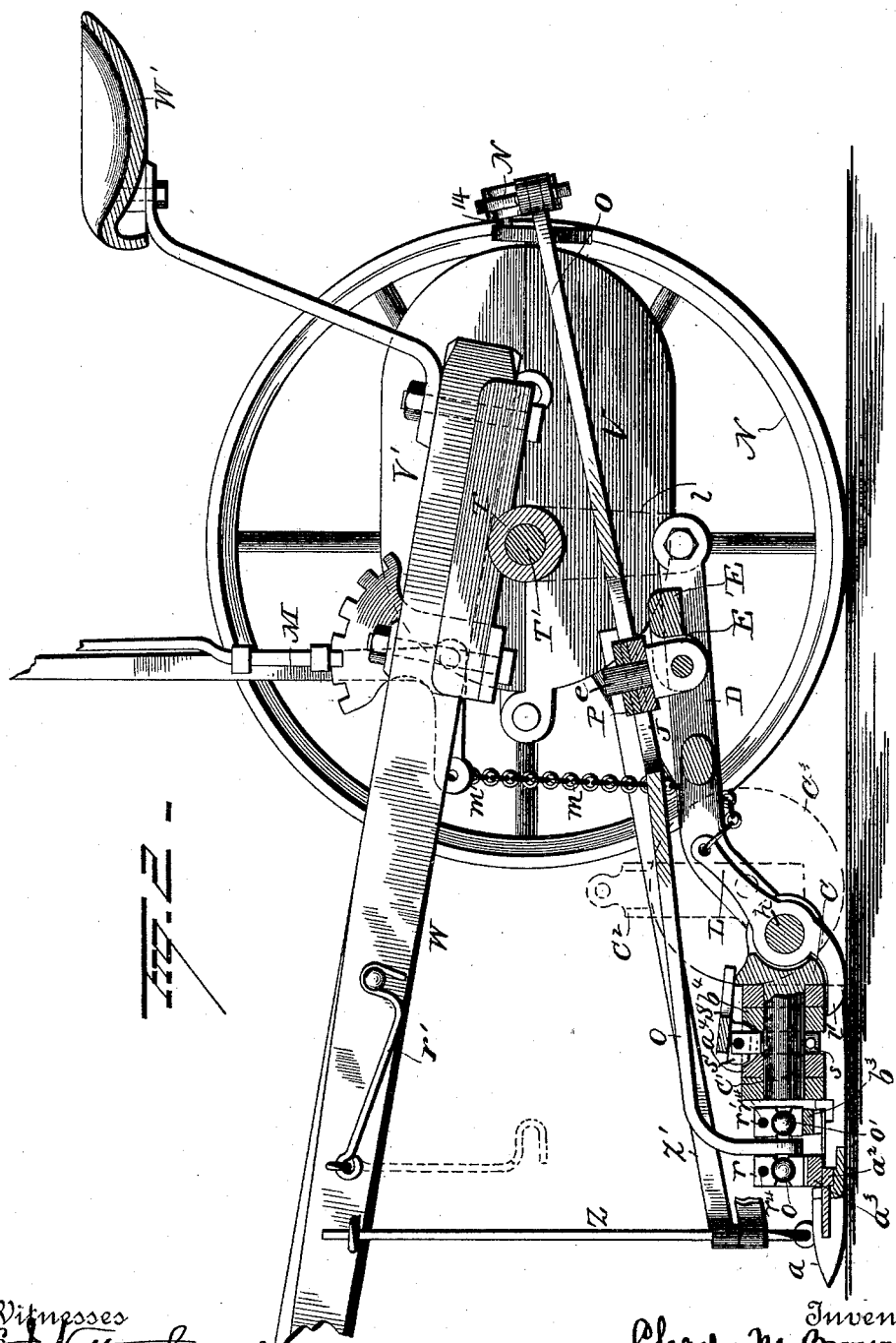

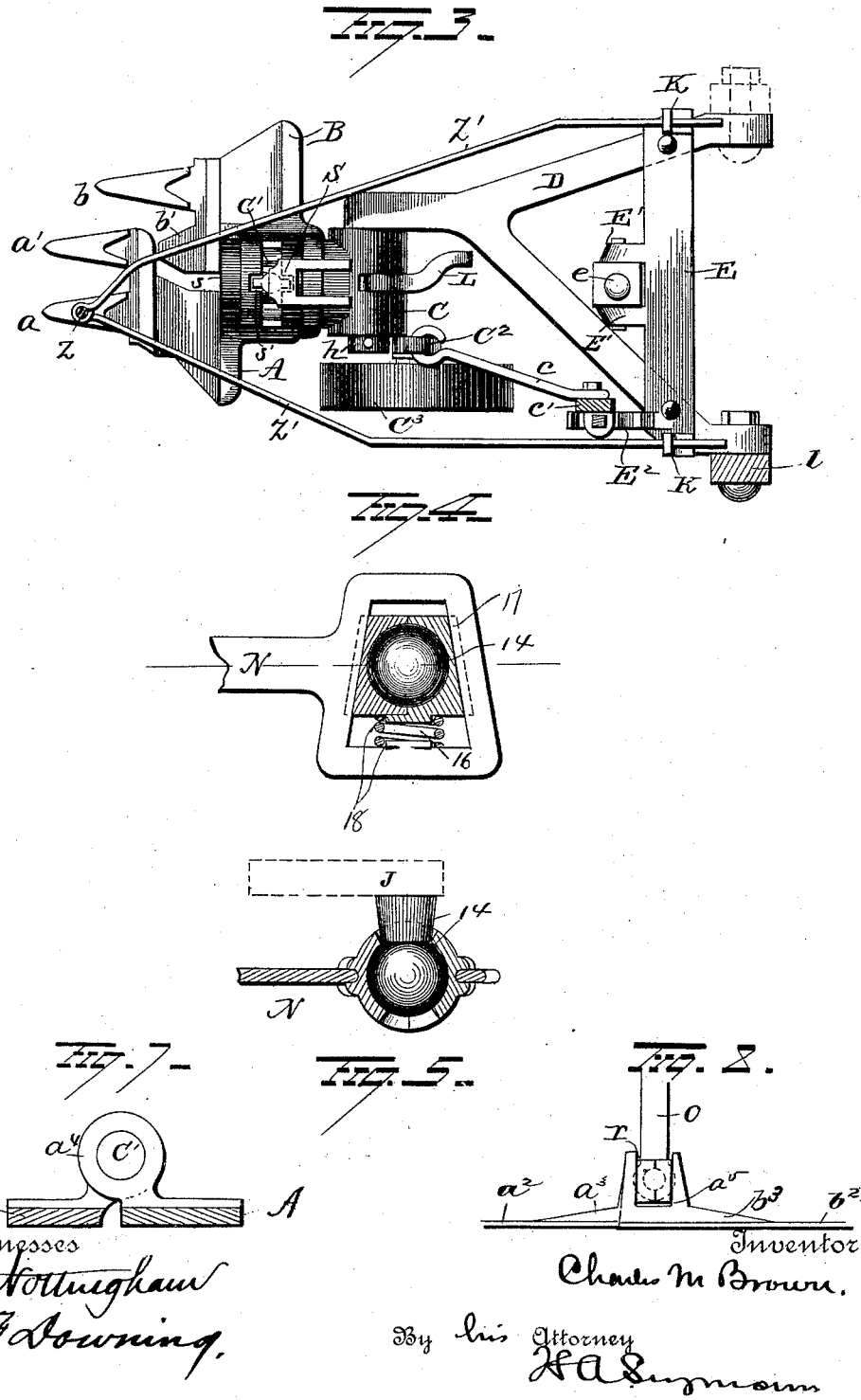

CHARLES M. BROWN, OF CHICAGO, ILLINOIS.

MOWING-MACHINE.

SPECIFICATION forming part of Letters Patent No. 411,276, dated September 17, 1889.

Application filed February 20, 1889. Serial No. 300,565. (No model.)

*To all whom it may concern:*

Be it known that I, CHARLES M. BROWN, of Chicago, in the county of Cook and State of Illinois, have invented certain new and useful Improvements in Mowing-Machines; and I do hereby declare the following to be a full, clear, and exact description of the invention, such as will enable others skilled in the art to which it appertains to make and use the same.

My invention relates to an improvement in mowing-machines, and more particularly to that class of machines designated "front-cut" mowing-machines.

It being desirable to cut a wider swath with a mowing-machine than has usually been done with those in common use attempts have been made to accomplish this by using longer knife-bars. It is found in practice, however, that there are many objections to their use, among which are the following: an increased strain on the sustaining parts of the bar, more than in proportion to its increased length; a largely-increased side draft; a much stouter finger-bar, which unless made too heavy and clumsy for convenient use is liable to spring and bend when passing over uneven ground, causing the knife or sickle bar to bear with greater friction, thus requiring a great deal of power to drive the machine, another objection being that the long bar does not readily accommodate itself to irregularities in the ground.

The principal object of my invention is to overcome these difficulties and to make an easy running wide-cut mower with light cutting apparatus and sustaining parts, the cutting apparatus to conform somewhat to uneven ground and at the same time to be as manageable during raising, tilting, and moving from place to place as other mowers now in common use; and a further object is to entirely dispense with uneven side draft by equalizing the pressure on each side.

With these ends in view my invention consists in certain novel features of construction and combinations of parts, as will be hereinafter fully described, and pointed out in the claims.

In the accompanying drawings, Figure 1 is a plan view. Fig. 2 is a longitudinal vertical section. Fig. 3 is an enlarged view of a portion of the machine. Figs. 4, 5, 6, 7, and 8 are detail views of parts.

T represents the tubular bar forming part of the frame of the machine, within which the axle T' is revolubly supported, and U U represent the drive-wheels, in the hubs of which the ends of the axle extend and are secured.

The usual gear-box V, having the hinged cover V', is formed integral or otherwise secured to the tubular bar of the main frame, and in it the gear and clutch mechanism hereinafter referred to is located and concealed. The tongue W is secured by bolts or other means to a plate integral with the tubular bar of the frame, and on the rear end of the latter the driver's seat W' is supported.

D represents a forked push-bar, the forked ends of which are pivoted beneath the tubular bar of the frame—one to a stout arm $l$, projecting downwardly from the latter just below the axle, and the other to a lug $l'$, extending from the lower portion of the gear-box V. The purpose of making these connections at a considerable distance below the axle is to lessen the effect which the rearward thrust of the cutting apparatus has when at work upon the traction of the driving-wheels. This rearward force, acting against the frame at an angle, has the effect of lessening the weight on the wheels, for the greater the angle caused by connecting the push D nearer the axle the greater the effect, and the more readily will the driving-wheels slip on the ground and fail to drive the knife-bars.

Cross-bar E, bolted securely to the forks of the push-bar, has a pair of ears E' at the center of its length, between which is pivoted the upright journal-post $e$, which will hereinafter receive further mention.

The cutting apparatus consists of two short finger-bars A' B', of about equal length, jointed together by one end of each being secured to the hinge-connected shoes A B. This flexible joint is placed beneath the tongue or draft-pole W, which is located about midway between the drive-wheels, and the finger-bars extend from the center at right angles to the line of draft and just in front of the drive-wheels. The inner ends of the finger-bars are bolted to two shoes A B, having hinge-like flanges which interlock with each other, and are held together pivotally by the pin C', one shoe A extending forward of the other. Attached to the forward shoe A are two guard-fingers $a$ $a'$, even and continuous with those on the finger-bar A'. The rear shoe B has one finger $b$ and one projection $b'$, which answers as a cutter-guard and produces, in effect, a continuation of the finger-bar B'. The guard-finger $b$ extends forward from the shoe B, even and continuous with corresponding parts on the finger-bar B'. The position of the two finger-bars is such that the knife-guard $b'$ comes directly behind the guard-finger $a'$ and close to it, the first section of knife-bar $b^2$ moving behind the guard-finger $a'$ when the machine is in operation. All these guard-fingers being spaced or pitched evenly, a cutting apparatus is produced which operates like one continuous bar equally located on both sides of the machine, so that all side draft or strain is equalized.

C', representing the pivot of the finger-bars, is a part of the coupling-piece C, pivoted on the laterally-projecting stud $h$, extending from the forward end of the forked push-bar D at a right angle to the line of draft. The sleeve C is located as closely as practicable to the finger-bars in front. The upright lever $C^2$ forms a part of the coupling-piece C, and extends from the side thereof opposite the forwardly-extending arm of the push-bar D. This lever $C^2$ has bolted to it a slide which carries the ground wheel or roller $C^3$, that is adjustable up or down, and which sustains the central parts of the cutting apparatus from the ground. One end of a rod $c$ is attached to the top of the lever $C^2$, the other end of the rod $c$ being pivoted to the tilting hand-lever $c'$, attached to the quadrant $E^2$, that forms a part of cross-bar E, at or near the side thereof. The movement of this lever forward or backward operates to tilt the points of the guard-fingers of the finger-bars up or down. The rollers X on the track-clearers X' at the ends of the bars are made adjustable up or down, and this, in connection with the adjustability of wheel $C^3$, allows the finger-bars to be carried at any desired distance from the ground, while the adjustment of the hand-lever $c'$ places the guard-fingers at any desired angle. There is a space between the shoes A and B, which, while the outer ends of the finger-bars remain on the ground, permits the central ends to be raised to a considerable height before the shoes come together. Lever L is pivoted on the stud $h$ of push-bar D in a slot in the center of coupling-piece C. The front end $l'$ of this lever is somewhat wedge-shaped, and is adapted to be forced into the space between the shoes and keep them apart. A chain $m$ is attached to the rear end of lever L, and thence passes downward around the fork of push-bar D, and then upward to connect with the arm $m'$ on the hand-raising lever M, which latter is located within easy reach of the operator.

When M is drawn backward, it first acts through the chain to pull downward the rear end of lever L and force the forward end $l'$ between the shoes A and B, where it fits tightly to prevent these parts coming together. When sufficient power is applied to lever M, both finger-bars are raised, the outer ends evenly with the center, as though they formed one straight bar, the stud $h$ acting as a fulcrum. It is sometimes desirable to so raise them—as, for instance, when passing over an obstruction. When no force is applied to end $l'$, it readily leaves its position between shoes A and B and the central joint of the bars becomes again flexible. A lever O extends rearwardly from the knife-bars beneath the pole, and this lever O is widened at the center and slotted so as to leave two parallel rods $j\ j'$ at the sides, which fit easily in the swivel-block P, that is pivoted on post $e$. The forward end of lever O bends downward in a vertical direction and comes immediately in front of the hinged parts of shoes A and B, and has at the front and rear two ball wrist-pins $o$ and $o'$, projecting horizontally therefrom, to which are fitted, respectively, two bearing-boxes $r$ and $r'$, each of which is made in halves and the parts secured together on the wrist-pin by means of a screw $r^4$, so that the boxes keep their places when lever O is disconnected from the knife-bars below. These boxes fit into rectangular transverse slots $a^5\ a^5$, made in pieces $a^3\ b^3$, that are riveted, respectively, to knife-bars $a^2\ b^2$. Box $r$ has flanges $r^3$ at the side to retain it in its place in $b^3$, and may be secured rigidly therein by the set-screw $r^2$. Box $r'$ has no flanges or set-screws and occupies any variable position in the slot in $a^5$ which may be required by the tilting of the bars. The centers of $o\ o'$ move in a horizontal plane corresponding in height with the axis of the pin C'. The construction of the central fulcrum of lever O is such that while the forward end is constrained to follow the straight movements of the knife-bars the other parts of the lever are at liberty to accommodate themselves to these movements in the different positions, forward and backward and laterally, required by the raising or tilting the finger-bars. When the mower is not in use, the outer ends of the finger-bars may be raised to nearly an upright position and there secured to the draft-pole by hooks $r'$ or other means. In order to do this successfully, it is necessary that lever O should be near its central line and the centers of wrist-pins $o\ o'$ be in a line, or nearly so, with the axis of the pin C'. Means are here provided by which the bars cannot be raised unless lever O is thus placed centrally. A pintle $s$ passes vertically through the pin C', between the hinge-ears $a^4\ b^4$ of shoes A and B, and holds the finger-bars in their places on the pin C'. The head of the pintle $s$ is fitted between the ears $a^4\ b^4$, so as to prevent the pintle from turning, and is slotted in a direction with the line of draft to receive the tang of the forked piece S, which is pivoted therein. Thus when the latter is turned backward onto coupling-piece C the projections $s'$, at the front and rear of its pivot, enter notches in the sides of the ears $a^4\ b^4$, so as to prevent them from turning. These notches are made somewhat wider than the projections $s'$, so as not to interfere with the proper flexibility of the joint of the knife-bars, small movements of which are not detrimental to the movements of the knife-bars. When the forked piece S is in the position shown in Figs. 2 and 3, it does not interfere with the vibratory movements of lever O. When it is desired to raise the finger-bars to an upright position, said forked piece S must first be turned up vertically; but this cannot be done unless lever O is placed at the center, when the forked end of piece S spans its sides and keeps it in place. The projections $s'$ are now turned out of engagement with the ears $a^4 b^4$, and the bars are readily raised. When the bars are lowered and the machine ready for work, the forked piece S is again turned backward.

The knife-bars may be taken out of their places to be sharpened by disconnecting the journal-boxes $r\ r'$ from them and raising the ends of the bars at the center. The knife-bars can then be drawn out of their bearings over the parts of the opposite finger-bars.

An upright rod Z is loosely connected at the lower end to the guard-finger $a$, the upper end being loosely held alongside of the tongue. One or more guard-bars Z' extend from this backward on either side, their rearward ends passing through guides K on cross-bar E. The object of these guard-bars is to prevent the cut grass from lodging on the lever O and other central parts of the mower. They do not interfere with turning up the cutter-bars.

Within the gear-box V a drive-pinion 1 is loosely mounted on the axle, and on one side of the hub of this pinion clutch-teeth 2 are formed. A movable clutch-section 3, with similar teeth 4 to the teeth 2 and adapted to interlock therewith, is mounted on the axle of the machine, so that the feather 5 on the latter extends loosely into a corresponding groove in the clutch-section, permitting the said section to slide on the axle, but carrying it with it as it revolves. Shipping-lever 7 is pivoted on the gear-box, with its forked end 8 spanning the clutch-section and entering the groove therein, while its other end projects rearwardly in proximity to the driver's seat, where it may be easily reached and operated to lock or unlock the drive-pinion 1 on the axle, thereby throwing the machine in or out of gear. This pinion 1 is meshed with a small pinion 9 on shaft 10 in the rear of the gear box or case, and integral or secured to said pinion 9 is another large pinion 11, about the size of pinion 1, which meshes with and drives pinion 12, adjacent to pinion 1 on the axle. Integral with pinion 12 is a bevel gear-wheel 13, and the latter actuates the drive-shaft H by its engagement with small bevel-pinion 15 on the contiguous end of the shaft. Shaft H is provided on its rear or opposite end with a crank-head J, and out of this projects the wrist-pin 14, which drives the pitman N, which at its opposite end is connected to the rear end of the lever.

In mower-pitmen now in common use the parts of the journal-box which surround the wrist-pin on the crank-head are secured by bolts and nuts or screws. These, owing to the rapid movements of the crank, are very liable to get loose and cause delay and damage. In pitman N, at the crank-head, the box is surrounded by continuous solid metal, which forms a wedge-shaped opening in which is fitted the journal-box, that has grooves 17 at the ends to fit the sides of the opening. The box is forced tightly into its place and retained there by a coiled spring 16, that is placed between the lower part of the box and the frame-work below it. This spring fits around guides 18, at each end, which retain it in its place. The sides of the parts of the box come together above and below the journal-ball and take the strain of the pressure on the ends, so that the box does not bind on the journal. These edges may be filed away to take up lost motion and the box forced farther upward in the opening, room being provided at the top to allow for this. There is room at the bottom, where the opening is wider, to take in the box. If desired, the other end of the pitman may be fitted in the same manner.

In operation the machine is thrown in gear by throwing the clutch in engagement with the teeth 2 on pinion 1. This sets the gearing in motion, actuating the drive-shaft H, pitman N, and lever O, which latter reciprocates the knife-bars.

It is evident that slight changes might be resorted to in the form and arrangement of the several parts described without departing from the spirit and scope of my invention, and hence I do not wish to limit myself to the exact construction herein set forth; but, Having fully described my invention, what I claim as new, and desire to secure by Letters Patent, is—

1. In a mowing-machine, the combination, with a push-bar, of a coupling-piece loosely connected thereto, two finger-bars pivoted to the coupling-piece in the same horizontal plane and slightly overlapping at their inner ends, knife-bars, and mechanism for reciprocating the latter, whereby one continuous swath can be cut by the two finger-bars and their knife-bars, substantially as set forth.

2. In a mowing-machine, the combination, with a push-bar, of a coupling-piece pivotally connected thereto, a pair of finger-bars pivoted to said coupling-piece in line with the center of the axle, the pivotal connection of both finger-bars being in the same horizontal plane, knife-bars, and mechanism for reciprocating the latter, substantially as set forth.

3. In a mowing-machine, the combination, with a pivoted push-bar and a coupling-piece pivotally connected therewith and adapted to move in a vertical plane, of finger-bars carried by the coupling-piece, knife-bars, a longitudinally-adjustable lever pivotally connected to the knife-bars, and mechanism for vibrating the lever.

4. In a mowing-machine, the combination, with a pair of finger-bars pivoted on the same axis and a device for locking said bars in a depressed condition, of knife-bars, a pivoted lever connected with said bars, and mechanism for vibrating the lever, substantially as set forth.

5. In a mowing-machine, the combination, with a pair of finger-bars, of knife-bars, a longitudinally-adjustable lever pivotally connected with said knife-bars, mechanism for vibrating the lever, and means for raising and tilting the finger-bars, substantially as set forth.

6. In a mowing-machine, the combination, with a main frame, a push-bar pivoted thereto, and a lever for raising and lowering the push-bar, a coupling-piece pivotally supported on the forward end of the push-bar, a supporting-wheel adjustably connected with said coupling-piece, and a lever connected with the coupling-piece for tilting the latter, substantially as set forth.

7. In a mowing-machine, the combination, with a main frame and a push-bar pivoted thereto, of a coupling-piece pivotally supported on the push-bar, a lever also pivoted on the push-bar within a slot on the coupling-piece, said lever having one end beneath the coupling-piece and the other end projecting backward, a pivoted hand-lever, and a flexible connection uniting the hand-lever with the first-mentioned lever, substantially as set forth.

8. In a mowing-machine, the combination, with a main frame, a push-bar pivoted thereto, and a coupling-piece pivotally supported on the push-bar, said coupling-piece having a projection thereon, of a pair of finger-bars pivoted on this projection, and a catch pivotally supported in the projection for locking the finger-bars, substantially as set forth.

9. In a mowing-machine, the combination, with a main frame, a push-bar pivoted thereto, and a coupling-piece pivotally supported on the push-bar, said coupling-piece having a projection thereon, of finger-bars supported on said projection, knife-bar, a vibrating lever for operating the latter, and a pronged catch pivoted in the projection adapted to lock the finger-bars when down and to straddle the vibrating lever when raised, substantially as set forth.

10. In a mowing-machine, the combination, with a main frame and a push-bar pivoted thereto, of a coupling-piece having a projection thereon, a pair of finger-bars pivoted on said projection, one in advance of the other in the same horizontal plane, knife-bars, and mechanism for operating said knife-bars, substantially as set forth.

11. In a mowing-machine, the combination, with a pair of shoes having projecting fingers thereon, one of said shoes located behind the other and having a projection back of one of the fingers on the front shoe, finger-bars secured to the shoes, track-clearers on the outer ends of the finger-bars, and rollers adjustably mounted upon said track-clearers, of knife-bars and gearing for operating said knife-bars together, substantially as set forth.

12. In a mowing-machine, the combination, with the main frame, a push-bar pivoted thereto, and finger-bars connected with the latter, of knife-bars and a vibrating lever having a swivel-connection with the knife-bars and a sliding pivotal connection with the push-bar, substantially as set forth.

13. In a mowing-machine, the combination, with the main frame, a push-bar pivoted thereto, and finger-bars connected with the latter, of knife-bars, a vibrating lever having a swivel-connection with the knife-bars and a sliding pivotal connection with the push-bar, a pitman connected with the opposite end of the lever, a driving-shaft for operating the pitman, and gearing for driving the shaft, substantially as set forth.

14. In a mowing-machine, the combination, with a pivoted push-bar and a coupling-piece pivotally connected therewith and adapted to move in a vertical plane, of finger-bars carried by said coupling-piece, knife-bars, a lever connected at one end with the knife-bars and having a sliding pivotal connection between its ends, with the push-bar, gearing for transmitting motion from the axle to the lever, and a clutch for throwing the machine into and out of gear, substantially as set forth.

15. In a mowing-machine, the combination, with a pair of finger-bars and a pair of knife-bars, of a lever for operating both knife-bars, said lever having ball-joints projecting from its end, one for each knife-bar, and sectional boxes on said ball-joints to connect the knife-bars to said lever, one of said boxes having flanges and set-screws for securing it to the knife-bars, substantially as set forth.

16. In a mowing-machine, the combination, with a pole, frame, and push-bar pivoted to the latter, of finger-bars connected with the push-bar, a rod extending loosely from one of the finger-bars through the pole, and guard-arms loosely mounted on the rod and having connection with the push-bar, substantially as set forth.

17. In a mowing-machine, the combination, with the finger-bars, knife-bars, driving mechanism, and a lever connected at one end to the knife-bars, of a pitman connecting said lever with the driving mechanism and having a wedge-shaped slot at one end carrying a journal-box for the wrist-pin of the driving mechanism, and means for yieldingly forcing the sections of the box into the smaller end of the slot, substantially as set forth.

In testimony whereof I have signed this specification in the presence of two subscribing witnesses.

CHARLES M. BROWN.

Witnesses:
WILLIAM CHONES,
L. J. HALIK.